United States Patent [19]

Schievelbusch

[11] Patent Number: 5,069,655
[45] Date of Patent: Dec. 3, 1991

[54] DRIVING HUB FOR A VEHICLE

[75] Inventor: Ulrich Schievelbusch, Kassel, Fed. Rep. of Germany

[73] Assignee: Fichtel & Sachs AG, Schweinfurt, Fed. Rep. of Germany

[21] Appl. No.: 625,909

[22] Filed: Dec. 11, 1990

[30] Foreign Application Priority Data

Dec. 12, 1989 [DE] Fed. Rep. of Germany ....... 3940919

[51] Int. Cl.$^5$ .............................................. F16H 3/72
[52] U.S. Cl. ..................................... 475/186; 475/192
[58] Field of Search ............... 475/190, 191, 192, 197, 475/216, 297, 185, 186

[56] References Cited

U.S. PATENT DOCUMENTS

| 2,108,082 | 2/1938 | Sharpe | 74/281 |
|---|---|---|---|
| 3,934,492 | 1/1976 | Timbs | 475/210 |
| 4,158,317 | 6/1979 | James | 475/185 X |
| 4,638,687 | 1/1987 | De Brie Perry | 475/216 X |
| 4,735,430 | 4/1988 | Tomkinson | 280/236 |
| 4,934,493 | 1/1976 | Hillyer | 475/297 |

FOREIGN PATENT DOCUMENTS 273495 2/1951 Switzerland .
2080452 2/1982 United Kingdom .

Primary Examiner—Dwight Diehl
Attorney, Agent, or Firm—Toren, McGeady & Associates

[57] ABSTRACT

The driving hub for a vehicle, in particular a bicycle, comprises a hub shaft (1), a hub sleeve (9) which is rotatable relative to the hub shaft (1) and a driver (13) rotatably mounted on the hub shaft (1). The driver (13) drives the hub sleeve (9) via a friction gear (17) of which the first toroidal disc (25) rests rigidly on the hub shaft (1), the friction wheel carrier (45) provided with several friction wheels (35) can be driven by the driver (13) and the second toroidal disc (27) is connected via a planetary gear (21) and an overrunning clutch (23) following the planetary gear (21) to the hub sleeve (9). The smoothly adjustable step-up ratio of the friction gear (17) is controlled from the interior of the hub shaft (1) via a rod (53) which entrains the pivotally mounted spindle (37) of the friction wheels (35) via a clutch ring (47). The rotating toroidal disc (27) is supported via an angular ball-bearing (31) on the thrust collar (33) of an expanding clutch (19) in such a way that the tip (71) of the pressure direction cone (69) defined by the angular ball-bearing (31) is located in the vicinity of the toroidal disc (27) in the center of the hub shaft (1). The toroidal disc (27) can therefore perform tilting movements and provides uniform contact pressure on the friction wheels (35).

11 Claims, 2 Drawing Sheets

DRIVING HUB FOR A VEHICLE

BACKGROUND OF THE INVENTION

The invention relates to a driving hub for a vehicle and, in particular, a driving hub with a friction gear of which the gear ration can be smoothly adjusted.

U.S. Pat. No. 4,735,430 discloses a driving hub for a bicycle of which the hub sleeve rotatably mounted in the bicycle frame is driven via a friction gear arranged in the hub sleeve with a hub shaft which is set into rotation by the pedals. The friction gear comprises two toroidal discs which are rotatably mounted on the hub shaft and are joined together in terms of friction via several friction wheels. The friction wheels are rotatably mounted on spindles which, in turn, are pivotal on a stationary friction wheel carrier round pivot pins extending in the tangential direction of the toroidal discs. One of the two toroidal discs rests axially movably on the hub shaft and is pressed via an expanding clutch provided with oblique slide faces against the friction wheels as soon as the hub shaft is driven. The other toroidal disc is coupled via a planetary gear and an overrunning clutch to the hub sleeve. For smooth adjustment of the step-up ratio of the friction gear, the spindles of the friction wheels are extended radially outward and engage in oblique slide slots of a control sleeve which is arranged inside the hub sleeve and rotatably surrounds the friction gear. The oblique position of the friction wheels relative to the hub shaft and therefore the step-up ratio of the friction gear can be altered by turning the control sleeve by means of a traction cable arrangement.

In the known driving hub, the hub sleeve is radially guided via the control sleeve on a housing of the friction gear. The wheel load complicates adjustment of the step-up ratio. As both toroidal discs have to be movably guided with the known driving hub, not only do production problems arise but also the reliability of operation and service life are adversely affected. Finally, the known driving hub requires special assembly means as the hub shaft has to be rotatably mounted in the bicycle frame other than with conventional driving hubs. The axial fixing of the hub sleeve relative to these assembly means is not sufficient for many applications with the known driving hub. Finally, special designs of a control mechanism are required for controlling the step-up ratio.

SUMMARY OF THE INVENTION

It is accordingly an object of the invention to provide a vehicle driving hub of which the step-up ratio can be smoothly adjusted. The driving hub should be of a simple design which is inexpensive to produce. Furthermore, the driving hub should allow permanent operation, and its step-up ratio should be easily adjustable with simple means.

The invention is based on a driving hub for a vehicle comprising a hub shaft, a hub sleeve which surrounds the hub shaft with the same axis and rotatably relative thereto and a driver mounted rotatably relative to the hub sleeve. Inside the hub sleeve there is arranged a friction gear which comprises two axially opposed toroidal discs and several friction wheels distributed in the circumferential direction of the toroidal discs and frictionally coupling the toroidal discs to one another and is arranged in the force path between driver and hub sleeve. The friction wheels are rotatably mounted on spindles, and the spindles, in turn, are mounted pivotally on a friction wheel carrier via pivot pins extending in the circumferential direction of the toroidal discs. At least one coupling device is provided which closes the force path between driver and hub sleeve when the hub is driven by the drive and opens the force path when the driver is not driven. A manually actuable control device which pivots the friction wheels together round the pivot pins is provided for smooth adjustment of the step-up ratio of the friction gear.

The improvement according to the invention resides in the fact that the driver is rotatably mounted not only relative to the hub sleeve but also relative to the hub shaft, the first of the two toroidal discs is non-rotatably arranged on the hub shaft on the side axially remote from the driver and the second toroidal disc is non-rotatably coupled, at least in the driving direction of rotation, to the hub sleeve, the friction wheel carrier is rotatably mounted on the hub shaft and is connected in terms of drive to the driver and the control device comprises a rod guided inside the hub shaft and a clutch ring which is articulated to the spindles of the friction wheels, is guided on the hub shaft and is movalbe along the hub shaft by means of the rod. With the friction gear of such a driving hub, only a single one of the two toroidal discs has to be movably guided, and this reduces tolerances which obstruct operation. The efficiency of the friction gear can be improved owing to its friction wheel carrier which rotates round the hub shaft in operation. The step-up ratio is controlled by the hub shaft of shift gear hubs of similar origin, the shifting mechanism not impairing operation of the friction gear and of the driving hub. It is also advantageous that the rotating second toroidal disc rotates in the same direction of rotation as the driver and the hub sleeve, so the friction gear can be used without an additional reversing gear.

The driving hub according to the invention is preferably used for driving bicycles, but can also be used for motorcycles or special vehicles such as self-propelled lawn mowers.

In a preferred embodiment, the rotating second toroidal disc is rotatably mounted on a thrust collar by means of a thrust bearing constructed as an angular ball-bearing, the angular ball-bearing defining a pressure direction cone of which the tip is located in the vicinity of the second toroidal disc approximately in the centre of the hub shaft. The thrust collar is movably guided together with the second toroidal disc along the hub shaft, and the coupling device comprises an expanding clutch axially arranged between the thrust collar and the driver, with ascending faces driving the thrust collar and therefore the second toroidal disc axially to the first toroidal disc when the drive is provided by the driver.

The expanding clutch ensures that the contact pressure with which the toroidal discs are pressed against the friction wheels increases as the driving moment of the driver increases. The pressure force can be increased substantially proportionally with the introduced torque by suitable selection of the angle of inclination of the rising faces. The mutually opposed rising faces of the expanding clutch can rest on one another in a sliding manner; however, balls can be interposed to improve the sliding action, as described, for example, in U.S. Pat. No. 4,735,430. The expanding clutch can be constructed such that it releases the second toroidal disc from the friction wheels in the absence of a drive by the driver and therefore disconnects the hub sleeve from the driver. Alternatively, however, the expanding clutch can also be pretensioned resiliently into the position of engagement between second toroidal disc and friction wheels so that it merely serves to increase the continuously existing frictional drive connection. In this variation, however, a one-way clutch, in particular a pawl-type one-way clutch is preferably provided in the force path between the second toroidal disc and the hub shaft to ensure that the friction gear remains at rest when the driver is stationary but the hub sleeve is rotating.

The thrust bearing constructed as an angular ball-bearing between second toroidal disc and the thrust collar allows slight tilting guidance of the second toroidal disc. The second toroidal disc is therefore applied to all friction wheels with equal contact pressure, particularly if three friction wheels arranged at equal angular intervals are provided. The tip of the pressure direction cone of the angular ball-bearing, located in the centre of the hub shaft, forms the momentary pole of the tilting movement which allows the second toroidal disc to compensate bearing and shape tolerances of the two toroidal discs and the friction wheels. The friction gear is therefore distinguished by particularly uniform running.

The driver which is preferably mounted on the hub shaft is coupled to the friction wheel carrier via a clutch sleeve also rotatably mounted on the hub shaft. The second toroidal disc surrounds this clutch sleeve. The clutch sleeve can be coupled directly to the driver but, to limit its axial length, preferably connects the friction wheel carrier to the thrust collar which is axially adjustable by the expanding clutch and is entrained in a rotating manner by the driver. For the non-rotating coupling of the clutch sleeve both to the thrust collar and to the friction wheel carrier there are preferably provided teeth which allow not only axial movement of the mutually coupled parts but also a slight tilting movement. Involute teeth at both ends of the clutch sleeve are suitable for this purpose.

A friction gear of the above-mentioned type increases the speed of rotation of the hub sleeve relative to the speed of rotation of the driver in any angular position of the friction wheels with respect to their pivot pin. This may be desirable for some applications, for example in special vehicles with particularly small wheels. Particularly with bicycles, however, it is desirable if not only step-up ratios but also step-down ratios can be adjusted. To achieve this, it is proposed in a preferred embodiment that a planetary gear be arranged inside the hub sleeve, of which the internal gear is connected to the first toroidal disc, the sun wheel is connected to the second toroidal disc and the planet wheels meshing with the internal gear and the sun wheel are mounted on a planet carrier which is connected to the hub sleeve and is rotatable round the hub shaft. While the friction gear shifts up the driving speed of the driver, the planet gear shifts the driving speed back down, preferably such that the speed of the hub sleeve is equal to the speed of the driver in a central pivot position of the friction wheels.

A comparatively compact driving hub is obtained if the planetary gear is arranged on the side of the second toroidal disc axially facing the driver and the internal gear has the form of a sleeve extending beyond the second toroidal disc to the first toroidal disc. The planetary gear can therefore be arranged compactly in the annular space remaining radially between hub sleeve and expanding clutch. The above-mentioned overrunning clutch can also be arranged in this space, even if no planetary gear is to be provided in this particular case.

The overrunning clutch is preferably a pawl-type overrunning clutch which is guided with one of its clutch halves, in particular its pawl teeth, on the second toroidal disc and is mounted with its other clutch half, in particular its pawl carrier, rotatably on the thrust collar rotatably guiding the second toroidal disc and is coupled to the hub sleeve. As the thrust collar and the second toroidal disc are also mounted on one another, in particular via the abovementioned angular ball-bearing, the components of the overrunning clutch are also orientated relative to one another in a simple manner.

The clutch ring of the control mechanism controlling the step-up ratio, which is movable on the hub shaft, preferably comprises two rings which are rotatable against one another, in particular via a ball-bearing, but are axially fixed. While the first of the two rings is axially displaced on the hub shaft merely according to the control movement of the rod which is movable in the hub shaft, the second ring rotates together with the friction wheel carrier round the hub shaft. The spindles of the friction wheels are articulated, in particular via ball-and-socket joints, to the second ring.

The various features of novelty which characterize the invention are pointed out with particularity in the claims annexed to and forming part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE DRAWINGS

Figure 1:
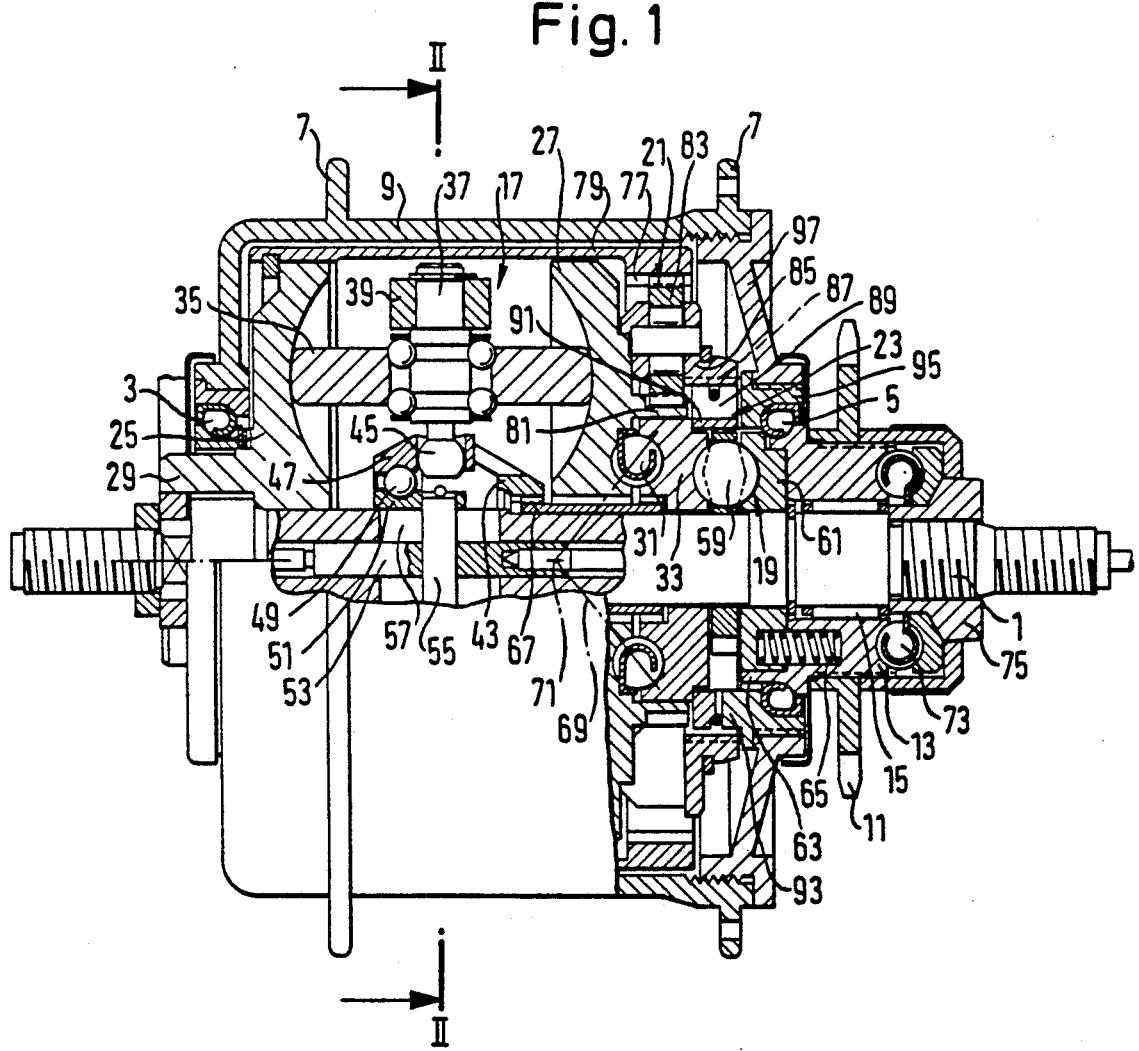
FIG. 1 shows an axial longitudinal section through a driving hub of a bicycle.

The driving hub shown in the drawings comprises a hub shaft 1 which is to be non-rotatably fixed on the bicycle frame and on which a hub sleeve 9 provided with spoke flanges 7 is rotatably mounted via ball-bearings 3, 5 in a manner which will be described in more detail hereinafter. A driver 13 provided with a sprocket wheel 11 is rotatably mounted axially to the side of the hub sleeve 9 on the hub shaft 1 by means of a needle bearing 15. Inside the hub sleeve 9 there is arranged a friction gear 17 which is coupled via an expanding clutch 19 to the driver 13 and via planetary gear 21 and a pawl-type overrunning clutch 23 following the planetary gear 21 to the hub sleeve 9. The driving torque of the driver 13 is transmitted via the expanding clutch, the friction gear 17, the planetary gear 21 and the overrunning clutch 23 to the hub sleeve 9. Torques originating from the hub sleeve 9, of the type occuring, for example, when travelling with a stationary driver 13, are kept away from all the gearing, which is therefore also stationary when the driver 13 is stationary, by the overrunning clutch 23.

Figure 2:
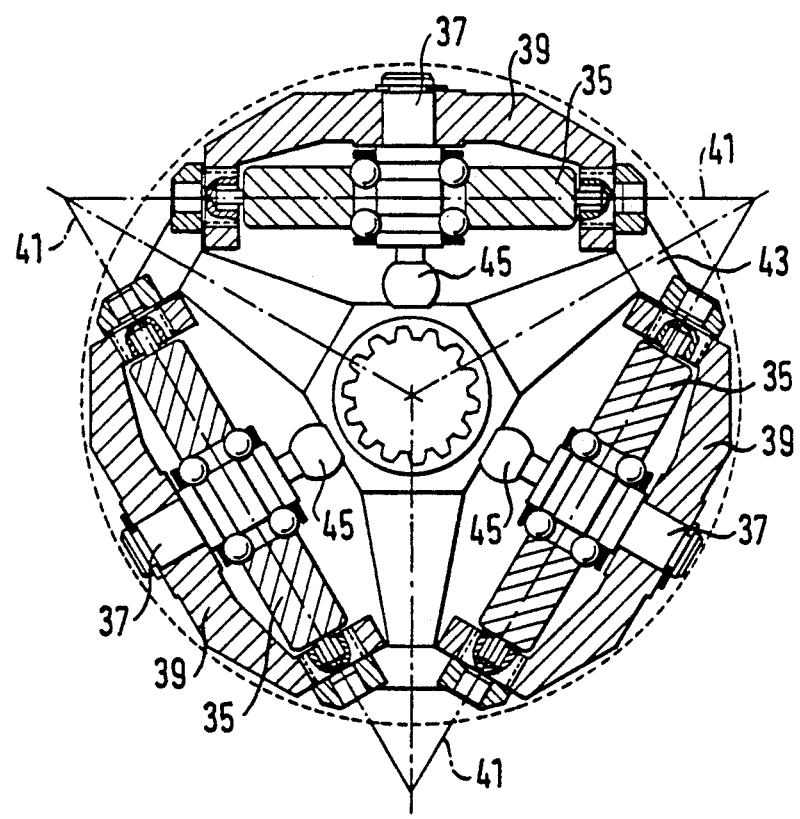
FIG. 2 shows an axial cross section through the driving hub, as viewed along a line II—II in FIG. 1.

The step-up ratio of the friction gear 17 which changes up the speed of the driver 13 is smoothly adjustable. The friction gear 17 comprises two axially spaced toroidal discs 25, 27 of which the toroidal disc 25 is rigidly held on the hub shaft 1 and simultaneously carries the bearing 3 of the hub sleeve 9 on a projection 29. The other toroidal disc 27 is guided in a rotatable and axially movable manner via an angular ball-bearing 31 on a thrust collar 33 of the expanding clutch 19. Three friction wheels 35 which are offset at an angle of 120° from one another and frictionally couple the toroidal discs 25, 27 to one another are arranged between the two toroidal discs 25, 27. Each of the friction wheels 35 is rotatably mounted on a spindle 37 of which the axis of rotation intersects the longitudinal axis of the hub shaft 1. As shown more clearly in FIG. 2, the spindles 37 are held on intermediate carriers 39 which, in turn, are mounted pivotally round pivot axes 41 on a common friction wheel carrier 43 rotatably mounted on the hub shaft 1. The pivot axes 41 lie in a common plane extending perpendicularly to the hub shaft 1, are equidistant from the hub shaft 1 and extend tangentially thereto.

The radially inwardly projecting ends of the spindles 37 are each provided with a ball head 45 by means of which they are articulated to a clutch ring 47 surrounding the hub shaft 1. The ball heads 45 engage in radial recesses in the clutch ring 47. The clutch ring 47 is connected via a ball-bearing 49 to a clutch ring 51 guided axially movably on the hub shaft 1 and transmits the control movement of a control rod 53 movably guided centrally in the hub shaft 1 to the clutch ring 47. The control rod 53 is displaceable via adjusting members (not shown) and carries a control block 55 which penetrates through an orifice 57 in the hub shaft 1 and into the clutch ring 51. The friction wheels 35 are pivoted together round their pivot pins 41 by axial displacement of the rod 53 so that the ratio of the track diameter $d_1$ of the toroidal disc 25 to the track diameter $d_2$ of the toroidal disc 27 can be adjusted smoothly. After the friction gear 17 has been driven by the driver 13 via the friction wheel carrier 43 in a manner which will be described hereinafter, the toroidal disc 27 invariably revolves at a higher speed than the friction wheel carrier 43. The ratio of the speed $n_2$ of the toroidal disc 27 to the speed $n_1$ of the friction wheel carrier 43 is given by the equation $$n_2/n_1 = 1 + d_1/d_2.$$

The expanding clutch 19 ensures that the axial contact pressure of the toroidal disc 27 increases almost proportionally with the increasing torque of the driver 13. The expanding clutch 19 guides the thrust collar 33 via balls 59 on an opposing thrust collar 61 which, in turn, is non-rotatably coupled to the driver 13 via teeth 63. The balls 59 are guided between oblique faces which clamps the thrust collar 33 and therefore the toroidal disc 27 against the friction wheels 35 during a rotation of the driver 13 in the driving direction. Compression springs 65 between the driver 13 and the opposing thrust collar 61 provide a predetermined initial pressure.

The torque transmitted by the expanding clutch 19 is transmitted from the thrust collar 33 to the friction wheel carrier 45 by a clutch sleeve 67 guided in a rotatable and axially movable manner on the hub shaft 1. The toroidal disc 27 surrounds the clutch sleeve 67. Teeth for non-rotating connection to the thrust collar 33 on the one hand and the friction wheel carrier 45 on the other hand are provided at both ends of the clutch sleeve 67. The teeth are constructed such that they allow slight tilting movements of the interconnected components. They are preferably involute teeth.

As indicated at 69 in FIG. 1, the angular ball-bearing 31 transmitting the axial forces of the thrust collar 33 to the toroidal disc 27 defines a pressure direction cone of which the tip 71 is located in the vicinity of the toroidal disc 27 in the centre of the hub shaft 1. The toroidal disc 27 can therefore perform tilting movements round the tip 71 as a pole and therefore ensures uniform contact pressure of the friction wheels 35. The reaction forces of the expanding clutch 13 are absorbed by a thrust bearing 73 by means of which the driver 13 rests on a solid cone 75 screwed onto the hub shaft 1.

The planetary gear 21 reduces the speed which has been changed up by the friction gear 17 down again. It is arranged on the side of the toroidal disc 27 axially facing the driver 13 and comprises internal gear teeth 77 on a sleeve 79 which surrounds the friction gear 17 and is non-rotatably connected to the toroidal disc 25, a sun wheel 81 integrally shaped on the toroidal disc 27 and planet wheels 83 which mesh with the sun wheel 81 and the internal gear teeth 77 and of which the planet wheel carrier 85 is rotatably guided on the toroidal disc 27. On the side axially facing the driver 13, the planet wheel carrier 85 carries an annular projection provided with pawl teeth 87 of the overrunning clutch 23. A pawl carrier 91 of the overrunning clutch 23 provided with pawls 89 is mounted radially inside the annular projection on the thrust collar 33. The pawl carrier 91 is non-rotatably coupled to an outer ring 95 of the ball-bearing 5 of the hub sleeve 9 via teeth 93 and, during rotation of the planet wheel carrier 85 in the driving direction, transmits the torque to the hub sleeve 9 which, for this purpose, is sealed by a screw cap 97 resting non-rotatably on the outer ring 95. The ball-bearing 5 is radially mounted on the driver 13. The screw cap 97 seals the hub sleeve from the exterior.

The step-down ratio of the planetary gear 21 can be selected such that the output speed of the hub sleeve 9 can be adjusted greater as well as smaller than the input speed of the driver 13, depending on the pivot position of the spindle 37 of the friction wheels 35.

While specific embodiments of the invention have been shown and described in detail to illustrate the application of the inventive principles, it will be understood that the invention may be embodied otherwise without departing from such principles.

What I claim is:

1. A driving hub for a vehicle comprising a hub shaft (1), a hub sleeve (9) which surrounds the hub shaft (1) with the same axis and rotatably relative thereto, a driver (13) rotatably mounted relative to the hub sleeve (9), a friction gear (17) which is arranged inside the hub sleeve (9), comprises two axially opposed toroidal discs (25, 27) and several friction wheels (35) distributed in the circumferential direction of the toroidal discs (25, 27) and frictionally coupling the toroidal discs (25, 27) to one another, and is arranged in the force path between driver (13) and hub sleeve (9), wherein the friction wheels (35) are rotatably mounted on spindles (37) and the spindles (37), in turn, are pivotally mounted on a friction wheel carrier (43) via pivot axes (41) extending in the circumferential direction of the toroidal discs (25, 27), at least one coupling device (23) which closes the force path between driver (13) and hub sleeve (9) when the hub is driven by the driver (13) and opens the force path when the driver (13) is not driven, a manually actuable control device (47, 51, 53) which pivots the friction wheels (35) together round the pivot axes (41) for smooth adjustment of the step-up ratio of the friction gear (17), wherein the driver (13) is also rotatably mounted relative to the hub shaft (1), the first (25) of the two toroidal discs (25, 27) is rigidly arranged on the hub shaft (1) on the side of the second (27) of the two toroidal discs axially removed from the driver (13) and the second toroidal disc (27) is non-rotatably coupled to the hub sleeve (9) at least in the driving direction of rotation, the friction wheel carrier (43) is rotatably mounted on the hub shaft (1) and is connected in terms of drive to the driver (13) and the control device (47, 51, 53) comprises a rod (53) guided inside the hub shaft (1) and a clutch ring (47, 51) which is articulated to the spindles (37) of the friction wheels, is guided on the hub shaft (1) and is displaceable along the hub shaft (1) by means of the rod (53).

2. A driving hub according to claim 1, wherein the second toroidal disc (27) is rotatably mounted on a thrust collar (33) by means of a thrust bearing constructed as an angular ball-bearing (31), wherein the angular ball-bearing (31) defines a pressure direction cone (69) of which the tip (71) is located in the vicinity of the second toroidal disc (27) substantially in the centre of the hub shaft (1), the thrust collar (33) together with the second toroidal disc (27) is movably guided along the hub shaft (1) and the coupling device has an expanding clutch (19) arranged axially between the thrust collar (33) and the driver (13) with rising faces which drive the thrust collar (33) and therefore the second toroidal disc (27) axially toward the first toroidal disc (25) when the drive is provided by the driver (13).

3. A driving hub according to claim 2, wherein the second toroidal disc (27) surrounds a coupling sleeve (67) which is rotatably mounted on the hub shaft (1), can be driven by the driver (13) and is non-rotatably coupled to the friction wheel carrier (43).

4. A driving hub according to claim 3, wherein the coupling sleeve (67) is non-rotatably coupled to the thrust collar (33).

5. A driving hub according to claim 3, wherein the coupling sleeve (67) has involute teeth for the driving connection at both ends.

6. A driving hub according to claim 1, wherein inside the hub sleeve (9) there is arranged a planetary gear (21) of which the internal gear (77) is connected to the first toroidal disc (25), the sun wheel (81) is connected to the second toroidal disc (27) and the planet wheels (83) meshing with the internal gear (77) and the sun wheel (81) are mounted on a planet wheel carrier (85) which is coupled to the hub sleeve (9) and is rotatable round the hub shaft (1).

7. A driving hub according to claim 6, wherein that the planetary gear (21) is arranged on the side of the second toroidal disc (27) axially facing the driver (13) and the hollow wheel (77) has the form of a sleeve (79) extending beyond the second toroidal disc (27) to the first toroidal disc (25).

8. A driving hub according to claim 1, wherein the coupling device has an overrunning clutch (23) in a driving connection between the second toroidal disc (27) and the hub sleeve (9).

9. A driving hub according to claim 8, wherein the overrunning clutch is constructed as a pawl-type overrunning clutch (23) and is arranged on the side of the second toroidal disc (27) axially facing the driver (13), is guided with one of its clutch halves, in particular its pawl teeth (87), on the second toroidal disc (27) and is mounted with its other clutch half, in particular its pawl carrier (91), rotatably on a thrust collar (33) rotatably guiding the second toroidal disc (27) and is coupled to the hub sleeve (9).

10. A driving hub according to claim 8, wherein a planetary gear (21) of which the output member, in particular the planet carrier (85), is connected via the overrunning clutch (21) to the hub sleeve (9) is arranged on the side of the second toroidal disc (27) axially facing the driver (13).

11. A driving hub according to claim 1, wherein the clutch ring (47, 51) comprises a first ring (51) which is non-rotatably guided on the hub shaft (1) and is coupled to the rod (53) and a second ring (47) which is mounted rotatably but axially rigidly via a ball-bearing (49) on the first ring (51) and is articulated to the spindle (37) of the friction wheels (35), in particular via ball-and-socket joints (45).

* * * * *